Dec. 17, 1957  B. T. ROGERS, JR., ET AL  2,816,476
HIGH-SPEED CAMERA
Filed Aug. 13, 1956  2 Sheets-Sheet 1

WITNESSES:

INVENTOR.
William C. Davis
BY Benjamin T. Rogers Jr.

2,816,476
Patented Dec. 17, 1957

2,816,476
HIGH-SPEED CAMERA

Benjamin T. Rogers, Jr., and William C. Davis, Los Alamos, N. Mex., assignors to the United States of America as represented by the United States Atomic Energy Commission Application August 13, 1956, Serial No. 603,852

4 Claims. (Cl. 88—16)

This invention relates to high-speed cameras, and in particular to high-speed cameras having resolution times of less than one-tenth microsecond.

In the study of many of the rapidly occurring phenomena of physics and chemistry, it is often necessary to have a very high speed camera in order to observe the phenomena with sufficient resolution to be able to understand how events are occurring. One such use for such a camera is in the study of high explosives during the time the explosive is detonating.

In the cameras of the prior art, the serious limitation to high speed has been the inter-relation between lens aperture and shutter speed, such that good total space resolution (total number of lines resolved) and a fast shutter speed have not been compatible. For example, the rotating mirror camera, as known prior to this invention and when used as a framing camera, must project the whole image within the optical system for the total time the photograph is being taken. Consequently, this places a limitation on the ratio of the total space resolution to the exposure time. This ratio is such that the cameras of the prior art can only resolve a total of about 25 lines across the picture at an exposure time of about $10^{-8}$ sec. The camera of the present invention eliminates the relationship between total space resolution and exposure time so that a total space resolution of about 250 lines or more is achieved at an exposure time of $10^{-8}$ sec. Further, cameras of the prior art have aperture ratios of about F:25 and have the theoretical limitation just noted, whereas the camera of the present invention has an aperture ratio of F:6, though, for example F:3, is easily achieved by increasing the diameter of the front lens or decreasing its focal length. Thus there is no theoretical limitation to the present invention.

In high-speed photography there are two general types of cameras which are used to record events which occur in a very short period of time. One is a so-called smear camera which records a light image, but not the actual object being photographed. The other general type of camera is the so-called framing camera which produces an actual object image of the object being photographed, similar to conventional cameras. Obviously, the framing camera can be used in situations not applicable to a smear camera, the main advantage being that more information can be gained because of the actual object image being reproduced on the film which is then easier to understand and "read" than the record produced by a smear camera.

The camera of this invention is a framing camera which uses a rotating mirror to transfer the image to the film, but unlike the rotating mirror cameras of the prior art, has an effective narrow slit in the optical path between the rotating mirror and the image recording surface and reflects the image from both the front and back surface of the rotating mirror. This slit, which may be either an opening in an opaque material or may be a very narrow mirror, has a similar effect as the slit in the curtain of a conventional focal-plane shutter. By acting similarly to a slit of a focal-plane shutter, the image is allowed to fall upon the film plane in discrete, narrow, separate pictures in the same manner as those taken by a focal-plane shutter though it is not optically similar to a focal-plane shutter. Thus, at any one instant of time, the image on the film surface is a narrow image increment; however, the increments are moving continuously across the film surface. The time involved between the first narrow photograph and the last narrow photograph is generally so short that the final image appears the same as if it were taken simultaneously with the first image, and in any event the time relationship is known so that corrections may be applied.

It is therefore an object of this invention to provide a high-speed camera having a large lens aperture.

Another object of this invention is to provide a high-speed camera having an effective shutter speed of less than one-tenth microsecond with good space resolution.

Another object of this invention is to provide a simple photographic means of recording physical phenomena which occur in an exceedingly short time space.

Further objects of this invention will be apparent from the specification and the appended claims and drawings, hereby made a part of this specification.

Figure 1:
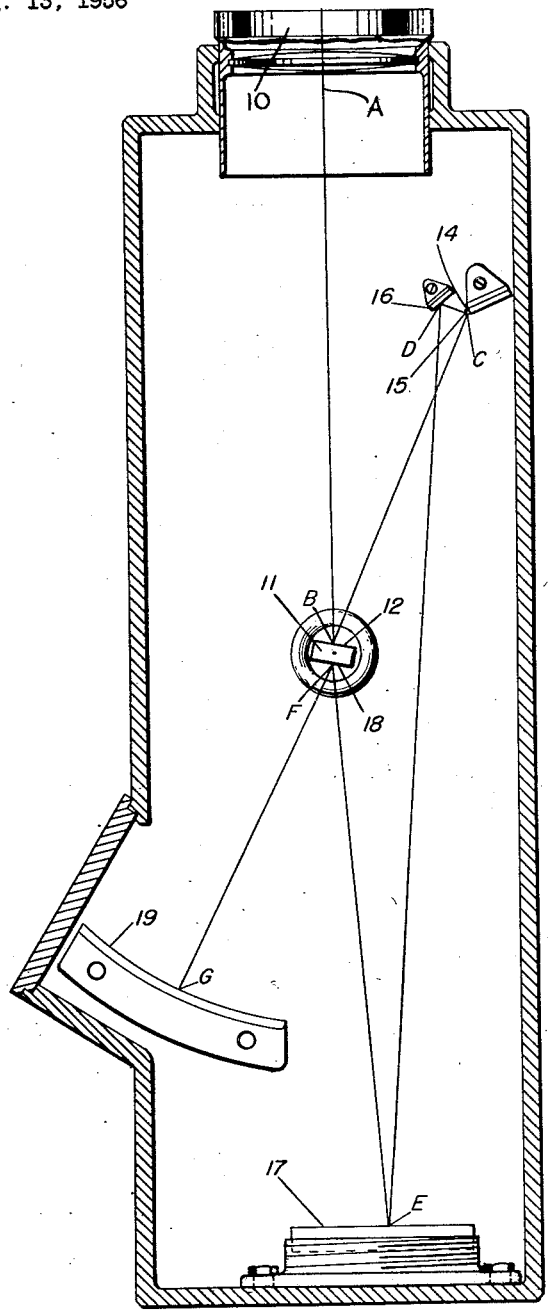
Figure 1 is a diagrammatic view of the camera of the present invention, showing the optical path of the light image thereby photographed.

Figure 1 shows a preferred embodiment of this invention. The components comprise a lens 10, a rotating mirror 11, a narrow mirror 14 which acts as an image increment reflector, a plane mirror 16, an ellipsoidal mirror 17, and an image recording or film surface 19.

The camera lens 10 has a focal length equal to the optical path ABC. The rotating mirror 11 reflects the object image from its front reflecting surface 12 to a narrow silvered edge 15 of glass 14. From reflecting edge 15 of glass 14 an image element or increment equal to the width of edge 15 is reflected to front surface mirror 16, along path CD. The image increment reflects from mirror 16 along optical path DE to ellipsoidal mirror surface 17. From the ellipsoidal surface 17 the image increment is reflected to a back reflecting surface 18 of rotating mirror 11, said surface 18 being preferably but not necessarily opposite aluminized reflecting surface 12. From back reflecting surface 17 along optical path FG the image increment is reflected to the curved film surface 19 which has a radius equal to distance FG and is the surface upon which photographic film may be placed.

The object image increment reflected from the reflecting edge 15 of mirror 14 has a width of about 2 mils, though this width can be varied to suit the particular needs of the experimenter. (One mil is equal to $\frac{1}{1000}$ inch.) It can be seen that the edge of mirror 14 acts in effect like a slit of 2 mils width in a focal plane shutter, and the resulting photograph on film plane 19 will be a progressive addition of the increments reflected from the edge mirror 14. With the camera of the preferred embodiment a total time of about 2 microseconds will elapse in taking a given photograph, but the actual exposure of any individual element is about $10^{-8}$ seconds.

With reference to Figure 1, the optical path is reflected twice from the rotating mirror—once from the front and once from the back surface. This double reflection from the mirror cancels an error which would otherwise result if only one reflection was used, since the moving mirror imparts an image movement as the result of the reflection from the front surface and its rotational speed. This image movement is subtracted when the optical path is reflected from the back surface 18 of mirror 11. In order for this subtraction to be exactly equal to that added in the front surface, optical path FG should equal optical path BC so that the lateral velocity of the image is zero.

Those skilled in the art will find it readily possible to build the camera of this invention with the following data. It must be understood, however, that a large number of variations are possible, that the physical size of this camera can be entirely different than the preferred embodiment, and that such specifications as the speed of the rotating mirror can be adjusted to suit the required conditions.

Lens 10 has a suggested focal length of 15.8 inches and 3 1/16 inches diameter. Rotating mirror B is 3/4 inch wide, 1 1/2 inches high, and 5/16 inch thick, and rotates at about 2500 R. P. S. or more. The front and back surface can be coated with any suitable reflecting material, though aluminum is preferred, deposited by the usual method well-known in the art.

Mirror 11 must be an optical flat while it is rotating. At 2500 R. P. S., the centrifugal force is not too great and a flat mirror may be used. However, at speeds of 5000 to 10,000 R. P. S. a flat mirror will distort while rotating and this distortion must be compensated. One means of doing this is to polish the mirror curved rather than flat so that it becomes flat at the rotating speed. This means has several disadvantages. Such a mirror surface is difficult to polish and only corrects in a narrow range of speeds. Another means which is more practical comprises placing correcting lenses in the optical path. These lenses may be replaced with a flat glass to adjust the camera with the rotating mirror stationary. It is a simple matter to change lenses for changes in selected speed of rotation. The back surface of mirror 11 does not have to be 180° from the front surface but can be any reasonable angle from the front surface. For example, the mirror could be hexagonal and any side chosen as the back surface.

Mirror 16 should be flat, but it is not essential that it be an optical flat. Its front surface should be coated similarly to mirror 11. The edge of mirror 14 should be as previously described, about 2 mils in width, and coated similarly to mirror 11.

Mirror 17 can be an ellipsoidal surface. It is cut from an ellipsoid having a minor diameter of 30 inches and a major diameter of 32.5 inches. The section of mirror 17 is taken from the oblate side of the ellipsoid with a minor axis passing thru its center. It is placed with its two foci in a line perpendicular to the vertical axis of the rotating mirror. It is possible to substitute a lens system in combination with a flat first surface mirror for ellipsoidal mirror 17, in which case the optical path would go through the lens to the mirror and back through the lens to surface 17 of mirror 11. However, it has been found considerably more convenient to use the ellipsoidal mirror. Film surface 19 is, for convenience, made with a radius equal to optical path FG. However, it can be readily seen that, since the image moves laterally on front surface 18 of mirror 11 as the mirror 18 rotates, a small amount of distortion is introduced when the film surface 19 is a simple radius. For nearly all processes this distortion is not important and is more convenient to accept than to apply a correction to the film surface. If desired, this error can be corrected by constructing the film surface so that the path FG is at all times equal.

With a mirror speed of 2500 R. P. S., a narrow reflector or slit of 2 mils width and a distance from mirror to narrow reflector of 5 3/4 inches, the exposure time will be about $1.1 \times 10^{-8}$ seconds. If the mirror speed is increased to 10,000 R. P. S., the exposure time will be one-fourth that or about $2.5 \times 10^{-9}$ seconds.

Figures 2, 3:
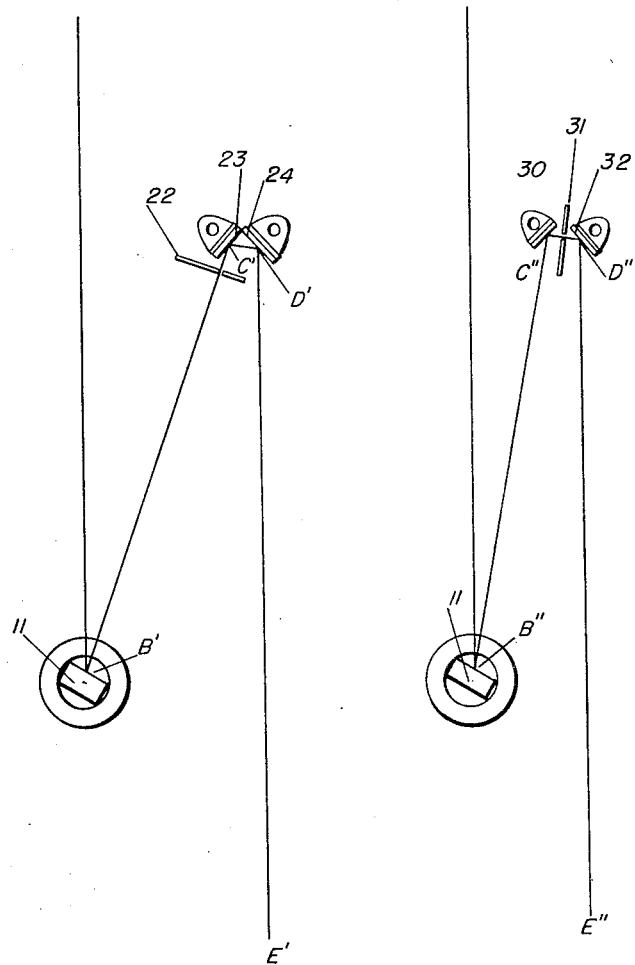
Figure 2 shows an alternative arrangement to the optical path of Figure 1.
Figure 3 shows a second alternative arrangement to the optical path of Figure 1.

As previously mentioned, the narrow edge 15 of mirror 14 may be replaced with a fine slit. With reference to Figure 2, the portion of the optical path involved in this embodiment is shown. In this case the image reflected from the surface 12 of mirror 11 follows optical path B'C' through a slit in opaque material 22, where it is reflected from a front surface mirror 23 to the front surface of mirror 24 along optical path C'D', and from the front surface of mirror 24 along optical path D'E', to ellipsoidal mirror 17.

A second alternative slit means is shown in Figure 3. Here the image is reflected from surface 12 of mirror 11 to mirror 30, thru a slit in opaque material 31, reflected by mirror 32, and then to the ellipsoidal mirror 17. Either of the variations shown in Figure 2 or 3 is in an optical sense equivalent to the narrow mirror 14, as each forms a narrow reflecting means which defines an image increment.

One of the main features of this invention is the method of cancelling the image velocity which the first reflection from the rotating mirror imparts to the image by reflecting the image from the back side of the rotating mirror. Another means of doing this is to reflect the image a second time from a separate rotating mirror whose speed and angular position is in known relation to the first mirror's speed and angular position. The speeds must be equal if the writing arms, BC and FG, are equal, but if the writing arms are not equal the speeds of the mirrors must be proportioned accordingly for image having zero lateral velocity. In this embodiment, the narrow increments can be defined by a slit without a reflecting mirror, since the image can pass through the slit directly to the second mirror. The principal reason for the increment forming means also being a reflecting means is to fold the optical path so as to be able to reflect the image on the back side of the rotating mirror.

The image, in the preferred embodiment, is recorded on a photographic emulsion, but it is understood that any suitable recording means such as photoelectric cells or television camera systems could be used as a recording media.

Other variations, in particular, variations in the optical paths, will be apparent to those skilled in the art and this invention is not limited by the foregoing description, but only by the appended claims.

What is claimed is:

1. In a device for taking high-speed photographs, rotatable means for reflecting light rays comprising a two-faced rotating optical mirror, leans means for transmitting light rays from the object to the photographed to one face of said optical mirror, a narrow reflecting means, said rays focused on and forming an image increment on said narrow reflecting means, an optical system for relaying and refocusing said image from said narrow reflecting means on a stationary film strip, said optical system including a second face of said optical mirror, the portion of the optical system between said narrow reflecting means and said second face of said optical mirror having an even number of reflecting surfaces so that the velocity imparted to said rays by said one face is cancelled by said second face and said distance from said one face to said narrow reflecting means being equal to the distance from said second face to said film strip.

2. The arrangement of claim 1 in which said narrow reflecting means is a mirror about 2 mils wide.

3. The arrangement of claim 1 in which said narrow reflecting means comprises a slit about 2 mils wide and a first and second mirror, said slit being in front of a first mirror, said first mirror in reflecting position relative to said second mirror, said second mirror in optical alignment with said optical system.

4. The arrangement of claim 1 in which said narrow reflecting means comprises a slit about 2 mils wide and a first and second mirror, said slit being between said two mirrors, said first mirror being in reflective position relative to said optical mirror and said slit, said second mirror being in reflective position relative to said optical system and said first mirror.

References Cited in the file of this patent

UNITED STATES PATENTS

| | | |
|---|---|---|
| 2,668,473 | Brixner | Feb. 9, 1954 |
| 2,687,062 | Baird | Aug. 24, 1954 |